United States Patent [19]

Stein

[11] Patent Number: 5,350,112
[45] Date of Patent: Sep. 27, 1994

[54] TEMPERED WATER MIXING SYSTEM

[75] Inventor: Matthew I. Stein, Truckee, Calif.

[73] Assignee: Haw Company, Sparks, Nev.

[21] Appl. No.: 146,951

[22] Filed: Nov. 3, 1993

[51] Int. Cl.$^5$ ............................................. G05D 23/13
[52] U.S. Cl. ................................... 236/12.13; 137/98; 137/110
[58] Field of Search ........................ 236/12.13, 12.12; 137/89, 110; 4/900

[56] References Cited

U.S. PATENT DOCUMENTS

| | | | |
|---|---|---|---|
| 2,506,700 | 5/1950 | Chace | 236/12.13 X |
| 2,528,422 | 10/1950 | Chace | 236/12.13 |
| 4,210,284 | 7/1980 | Tarnay et al. | 239/75 |
| 4,313,350 | 2/1982 | Keller, III et al. | 74/526 |
| 4,423,752 | 1/1984 | Psarouthakis | 137/625.41 |
| 4,480,784 | 11/1984 | Bennett | 236/93 B |
| 4,653,524 | 3/1987 | Wilson | 137/100 |
| 4,685,156 | 8/1987 | Brabazon | 4/194 |
| 4,711,393 | 12/1987 | Lee | 236/12.15 |
| 4,774,978 | 10/1988 | Lepine, Jr. et al. | 137/334 |
| 4,854,499 | 8/1989 | Neuman | 236/93 B |
| 4,909,435 | 3/1990 | Kidouchi et al. | 236/12.12 |
| 5,024,378 | 6/1991 | Bergmann et al. | 236/93 B |
| 5,100,261 | 3/1992 | Plemon | 405/186 |
| 5,125,433 | 6/1992 | DeMoss et al. | 137/607 |
| 5,135,028 | 8/1992 | Rickenbach et al. | 137/599 |
| 5,184,642 | 2/1993 | Powell | 137/607 |

OTHER PUBLICATIONS

Warming up to a Good Idea-1993 Buyers' Guide.
TM-186-PRV High-Low Assembly-Leonard Water Temperature Con.
Hydroguard Series 430 Master Mixing Valves.
Temperature Limits in Service Hot Water Systems An ASPE Research Foundation Report.
Saf-T-Flo Fail-Safe Blending System-Ebcon Safety Products.

Primary Examiner—William E. Tapoical
Attorney, Agent, or Firm—Kelly Bauersfeld & Lowry

[57] ABSTRACT

A tempered water mixing system for applications such as emergency drench shower and eyewash stations, wherein the mixing system includes back-up control valves to ensure a substantial water flow without risk of user scalding in the event of malfunction of a main thermostatic mixing valve. The main mixing valve thermostatically blends cold and hot water supplies to provide a tempered discharge outflow at a selected temperature. A temperature limit control valve detects the discharge outflow temperature and responds to an excess temperature condition to modulate hot water flow in a manner reducing discharge temperature. A flow limit control valve detects the pressure differential between the discharge outflow and the cold water supply, and responds to a low flow condition represented by a high pressure differential to permit a make-up bypass flow of cold water past the main mixing valve.

6 Claims, 1 Drawing Sheet

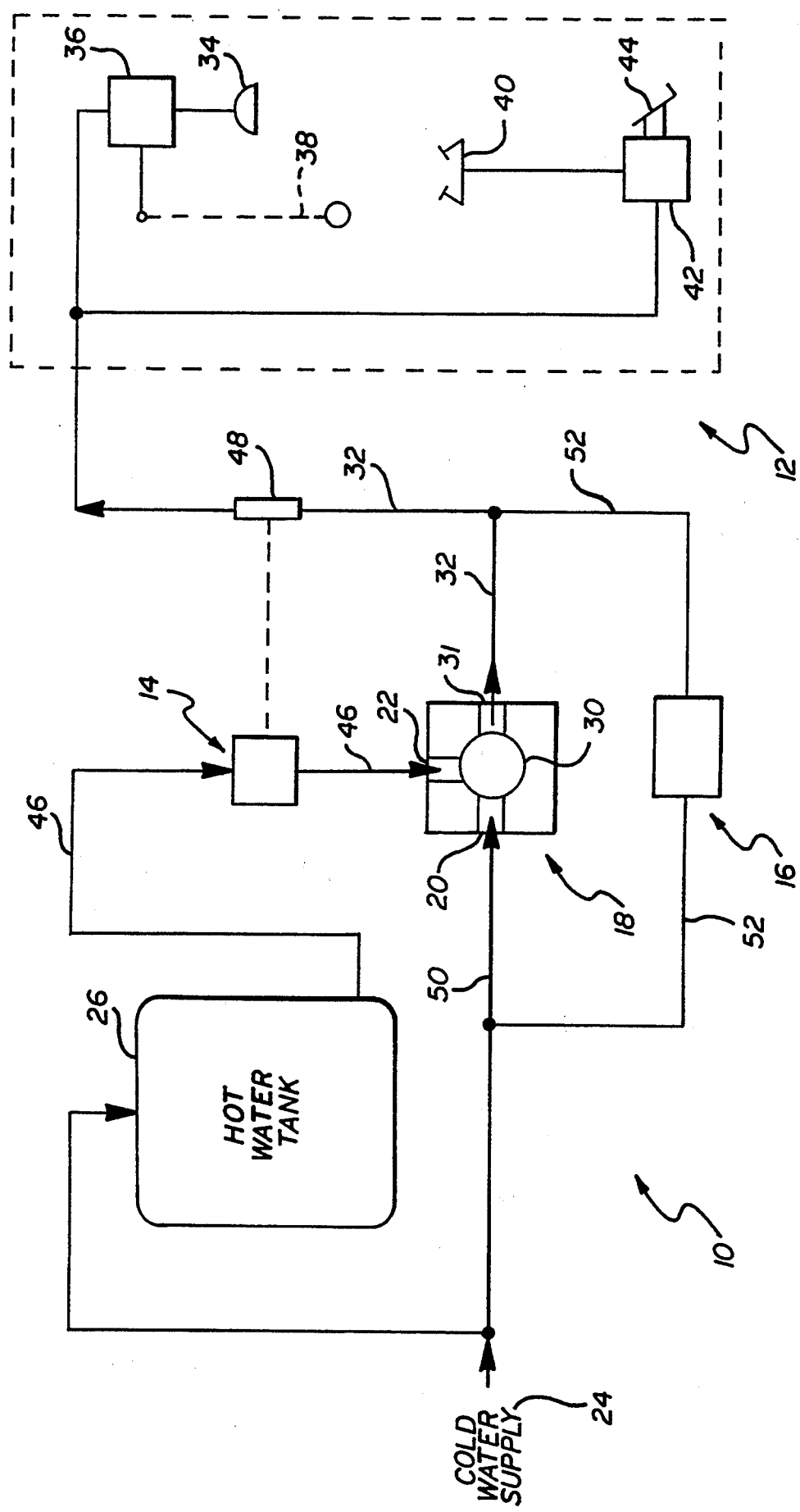

TEMPERED WATER MIXING SYSTEM

BACKGROUND OF THE INVENTION

This invention relates generally to tempered water mixing systems of the type used in emergency drench shower and eyewash stations, wherein cold and hot water supplies are thermostatically blended to provide a tempered discharge outflow at a selected temperature. More particularly, this invention relates to improvements in tempered water mixing systems, wherein back-up control valves are provided to permit substantial system water flows without risk of user scalding in the event of malfunction of a main thermostatic mixing valve.

Tempered water mixing systems are generally known in the art for providing a discharge outflow at a selected and relatively lukewarm, or tempered, temperature. Such mixing systems are used in a variety of commercial and/or industrial applications, particularly such as emergency drench shower stations and/or safety eyewash stations used to rinse hazardous chemicals from a person's skin and clothing. A typical system includes a thermostatic mixing valve adapted for connection to a cold water supply and a hot water supply, and including means for thermostatically and automatically blending the water inflows to produce a discharge outflow having the selected temperature. An exemplary thermostatic mixing valve of this general type is available from Powers Process Controls of Skokie, Ill., under the designation Hydroguard Series Nos. 420 and 430.

In the past, tempered water mixing systems have periodically encountered malfunction in the operation of the thermostatic mixing valve. Such malfunction can occur in any one of several modes. As one example, the mixing valve can stick in a position providing unregulated full flow of hot water, resulting in extremely undesirable and potentially dangerous scalding of a person using an emergency shower or eyewash station. In another mode, the mixing valve can stick in a position which allows unregulated full flow of cold water, whereby a person using an emergency shower or eyewash station may be subjected to undesirably cold water flow. Unfortunately, this cold water flow condition typically results in undesirably shortened flush or rinse times and can contribute to hypothermia in installations located in a cold weather climate. Another failure mode results in insufficient flow of hot or cold water, such that the discharge outflow is inadequate for proper flush flow rinsing of contaminants from a person using a drench shower or eyewash station.

Some tempered water mixing systems have been designed with back-up features intended to address the failure modes noted above. For example, solenoid operated valves have been used in combination with various temperature switches and/or flow rate switches for bypassing cold water flow past the main mixing valve when a malfunction occurs. Such devices, however, rely upon electrical power to achieve proper back-up operation. In the event of a power failure, the back-up devices in such systems have generally failed to function, or otherwise provide only for cold water flow. Moreover, during normal operation, the electrically operated components can cycle back-and-forth, so that a user is subjected to alternating brief flows of water which is either too hot or too cold. Further, electrically powered back-up devices are unacceptable for use in many industrial applications in proximity with volatile materials.

There exists, therefore, a significant need for further improvements in tempered water mixing systems particularly of the type used for emergency drench shower and eyewash stations, wherein the system includes back-up features responsive to malfunction of a main mixing valve to provide continued and substantial flow of water at a tempered temperature level. The present invention fulfills this need and provided further related advantages.

SUMMARY OF THE INVENTION

In accordance with the invention, an improved tempered water mixing system is provided for substantially fail-safe blending of cold and hot water supplies to provide a tempered discharge outflow at a selected temperature level. The mixing system includes a thermostatically operated main mixing valve for blending the cold and hot water supplies during normal system operation. Back-up control valves are provided and respond to system parameters indicative of a malfunction in the main mixing valve to provide an uninterrupted discharge outflow at a substantial flow rate, and, to the extent possible, at a temperature level approaching the selected outflow temperature. The mixing system of the present invention is particularly adapted for use in applications such as emergency drench shower and/or eyewash stations.

In accordance with a preferred form of the invention, the main thermostatic mixing valve is conventionally coupled to a cold water supply and a hot water supply, and includes a thermostatic motor for blending the cold and hot water inflows in a manner obtaining a tempered water outflow at a selected temperature level. A high temperature limit control valve includes a temperature sensor for monitoring the actual temperature of the discharge outflow from the main mixing valve. When that actual temperature exceeds a preset limit representative of improper operation of the main mixing valve, the temperature limit control valve modulates hot water flow to the main mixing valve in a manner to achieve a regulated reduction in the temperature level of the discharge outflow. Thus, the high temperature limit valve comprises one back-up valve for regulating the temperature of the discharge outflow in the event of mixing valve malfunction.

A flow limit control valve is responsive to the pressure differential between the cold water supply and the discharge outflow from the main mixing valve. When this pressure differential exceeds a preset limit, representative of improper system operation, the flow limit control valve opens to permit modulated bypass flow of make-up cold water past the main mixing valve. In one mode, such bypass flow is permitted when the high temperature limit control valve reduces hot water inflow sufficiently to reduce the overall flow rate of the discharge flow below a threshold limit. The cold water bypass flow results in a reduction in temperature of the discharge outflow, whereupon the temperature control valve may open to permit increased hot water system flow. In an alternative back-up mode, in the event that water flow through the main mixing valve is obstructed to result in a significant reduction in the flow rate of the discharge outflow, the flow limit control valve responds to the resultant pressure differential to permit a substantial albeit relatively cold water flow through the system. Thus, the flow limit control valve comprises a second back-up valve for regulating the discharge outflow rate in the event of main mixing valve malfunction.

Other features and advantages of the present invention will become more apparent from the following detailed description, taken in conjunction with the accompanying drawing which illustrates, by way of example, the principles of the invention.

BRIEF DESCRIPTION OF THE DRAWING

The accompanying drawing illustrates the invention in schematic form.

DETAILED DESCRIPTION OF THE PREFERRED EMBODIMENT

As shown in the exemplary drawing, a tempered water mixing system referred to generally by the reference numeral 10 is provided for use in supplying a relatively warm and controlled temperature discharge outflow to an emergency drench shower and/or eyewash station 12. In accordance with the invention, the mixing system 10 includes a temperature limit control valve 14 and a high pressure responsive flow limit control valve 16 which provide back-up system regulation in the event of a malfunction in a main thermostatic mixing valve 18.

The tempered water mixing system of the present invention is particularly designed for use in providing a tempered or relatively lukewarm water outflow for use in emergency drench shower applications and the like. However, it will be understood that the invention is applicable to other tempered water mixing system applications, such as various industrial process applications, etc. The mixing system 10 is designed to provide a discharge water outflow at a selected and relatively lukewarm temperature level, without significant risk of a failure mode in which excessive quantities of hot water are inadvertently delivered. Moreover, the system is designed to establish a priority with respect to temperature and flow rate, in a manner insuring a minimum and substantial water flow rate at all times.

The main thermostatic mixing valve 18 is conventionally used in tempered water mixing systems, and includes a cold water inlet 20 and a hot water inlet 22 adapted for respective connection with a suitable cold water or tap supply 24 and a hot water supply 26, such as by connection to the discharge side of a suitable hot water tank. The mixing valve 18 includes a thermostatically operated motor 30 which automatically blends the cold and hot water inflows in selected proportion to deliver a discharge outflow via an outlet 31 to a flow conduit 32. As shown in the exemplary drawing in an emergency drench shower application, the discharge flow conduit 32 is connected to an emergency drench shower head 34 equipped with a shut-off valve 36 which can be opened, for example, by means of a pull cord 38. The flow conduit 32 may also or in the alternative be connected to an eyewash station 40 equipped with a shut-off valve 42 adapted for rapid opening, for example, by depression of a foot switch 44. An exemplary thermostatic mixing valve of the type used herein can be obtained from Power Process Controls of Skokie, Ill., under the designation Hydroguard Series 430, wherein the thermostatic motor 30 is adjustably set to a selected temperature disclosure outflow temperature of typically about 80 degrees Fahrenheit.

In accordance with the invention, the high temperature limit control valve 14 and the pressure responsive flow limit control valve 16 provide for fail-safe system operation, in the event that a malfunction in the mixing valve 18 occurs. These control valves 14, 16 function, in general terms, to prevent water discharged through the flow conduit 32 from exceeding a preset upper end temperature limit, thereby protecting against undesired scalding of a person using the emergency shower head 34 or eyewash station 40. In addition, these control valves function to ensure that a minimum and substantial flow rate is provided through the flow conduit 32, wherein flow rate takes priority over temperature to ensure the availability of flush water in an emergency situation.

The temperature limit control valve 14 is installed along a flow line 46 extending from the hot water tank 26 to the hot water inlet 22 of the main mixing valve 18. This control valve 14 includes a temperature sensor 48 coupled to the discharge conduit 32 for monitoring the actual discharge temperature of the blended tempered water. When that temperature level of the tempered water in the flow line 32 exceeds a preset limit, such as about 85 degrees Fahrenheit, the temperature limit control valve 14 responds to modulate or restrict hot water flow to the mixing valve 18 in a progressively decreasing manner, for purposes of reducing the temperature of the discharge outflow along the flow conduit 32. Thus, in the event that a mixing valve malfunction causes an increase in the temperature level of the discharge water, to or above the preset limit, the sensor 48 signals the back-up temperature control valve 14 to restrict hot water flow in a manner preventing an excess temperature condition of the water supplied to the emergency station 12.

Modulation of the temperature limit control valve 14 may cause a significant reduction in the total water flow rate through the discharge flow conduit 32. In the alternative, such flow rate reduction can occur in a plumbing installation wherein multiple flow valves are opened at the same time. The pressure responsive flow limit control valve 16 is responsive to detect a low flow condition, and to respond by supplementing the water flow through the flow conduit 32. This water flow supplementation is independent of actual temperature of the water delivered through the flow conduit 32.

More particularly, the flow limit control valve comprises in the preferred form a pressure differential responsive bypass valve for permitting a make-up bypass flow of cold water from a cold water supply line 50 past the mixing valve 18 through a bypass line 52 directly to the discharge flow conduit 32. In this regard, the control valve 16 responds to pressure differential between the cold water supply 24 and the discharge flow conduit 32, and to progressively open when that pressure differential reaches a predetermined limit indicative of a low flow condition. A minimum pressure differential between the cold water supply 24 and the discharge flow conduit 32 is thus maintained, thereby assuring a substantial water flow rate through the discharge conduit 32 at all times. In a typical installation, the pressure responsive control valve 16 may be set to open when the pressure differential reaches a level of about 5–20 psi.

The temperature limit and flow limit control valves 14 and 16 may will normally operate in coordination with each other. For example, the temperature limit control valve 14 may detect an excess temperature condition and respond by restricting hot water flow to the mixing valve 18. The flow limit control valve 16 may then detect a low flow condition as a result of partial closure of the temperature limit valve 14. The flow control valve 16, responds to a detected low flow condition by permitting bypass make-up flow through the bypass line 52 past the mixing valve 18. As a result of this cold water bypass flow, the temperature of the water in the discharge conduit 32 is reduced, whereupon the sensor 48 signals the temperature limit control valve 14 to return toward a full open position. Thus, in many failure modes, the control valves 14 and 16 will operate in a coordinated fashion to maintain the discharge water temperature at the desired tempered level. The water temperature along the flow conduit 32 will not be reduced below the desired tempered level unless hot water flow is substantially or fully obstructed. In that event, as a fail-safe operational mode, a substantial flow of cold water is still permitted.

The present invention thus provides an improved tempered water mixing system, with fail-safe back-up operation in the event of malfunction in a main thermostatic mixing valve. The back-up components permit the temperature level of the tempered water to be maintained without excessive temperature and without undesired temperature reductions for most failure modes. Thus, use of a main mixing valve 18 with an adjustable thermostatic motor 30 permits manual setting of the mixing valve to provide an excess temperature outflow on a temporary basis to confirm proper back-up operation of the high temperature limit valve 14. In this regard, it is preferred that the high temperature limit valve 14 be nonadjustable to prevent tampering.

The high temperature control valve 14 and the pressure responsive control valve 16 may comprise commercially available valve products capable of providing the desired functional operation described herein. For example, the high temperature limit valve 14 may comprise a thermostatic valve of the type available from Amot Controls Corporation of Richmond, Calif. under model designation 2470. Similarly, the pressure responsive control valve 16 may comprise a bypass regulator valve of the type available from A.W. Cash Valve Mfg. Corp., Decatur, Ill. under type designation K-5 or K5C.

A variety of further modifications and improvements to the invention will be apparent to those skilled in the art. Accordingly, no limitation on the invention is intended by way of the foregoing description and accompanying drawings, except as set forth in the appended claims.

What is claimed is:

1. A tempered water mixing system, comprising:
   a main mixing valve for connection to a cold water supply and a hot water supply, and including means for blending the cold and hot water supplies to provide a discharge outflow having a selected temperature level;
   a high limit temperature control valve including sensor means for detecting the temperature of the discharge outflow, and for modulating hot water flow to said main mixing valve when the temperature of the discharge outflow exceeds a preset limit; and
   a flow control valve responsive to the pressure differential between the cold water supply and discharge outflow for bypassing a make-up flow of cold water past said main mixing valve to the discharge outflow when said pressure differential exceeds a predetermined limit.

2. The tempered water mixing system of claim 1 wherein said means for blending the cold and hot water supplies comprises a thermostatic motor.

3. A tempered water mixing system, comprising:
   a main mixing valve having a cold water inlet, a hot water inlet, a discharge outlet, and thermostatic blending means for blending cold and hot water inflows coupled respectively to said cold and hot water inlets to provide a tempered water discharge outflow at a selected temperature level at said discharge outlet;
   a cold water supply conduit for supplying cold water to said cold water inlet;
   a hot water supply conduit for supplying hot water to said hot water inlet;
   a discharge flow conduit connected to said discharge outlet;
   a high temperature limit valve connected along said hot water supply conduit and including means responsive to the temperature of said discharge outflow for modulating hot water flow through said hot water supply conduit to prevent the temperature of the discharge outflow from exceeding a preset upper limit; and
   a flow control valve connected between said cold water supply conduit and said discharge flow conduit and including means responsive to the pressure differential between the cold water supply and said discharge flow outlet conduit to permit a bypass flow of make-up cold water from said cold water supply conduit to said discharge outflow conduit when said pressure differential exceeds a predetermined limit.

4. The tempered water mixing system of claim 3 wherein said means for blending the cold and hot water supplies comprises a thermostatic motor.

5. The tempered water mixing system of claim 3 wherein said sensor means comprising a temperature sensor coupled to said discharge outflow conduit.

6. The tempered water mixing system of claim 3 wherein said flow control valve is connected along a bypass conduit connected between said cold water supply conduit and said discharge flow conduit.

* * * * *